2,153,016

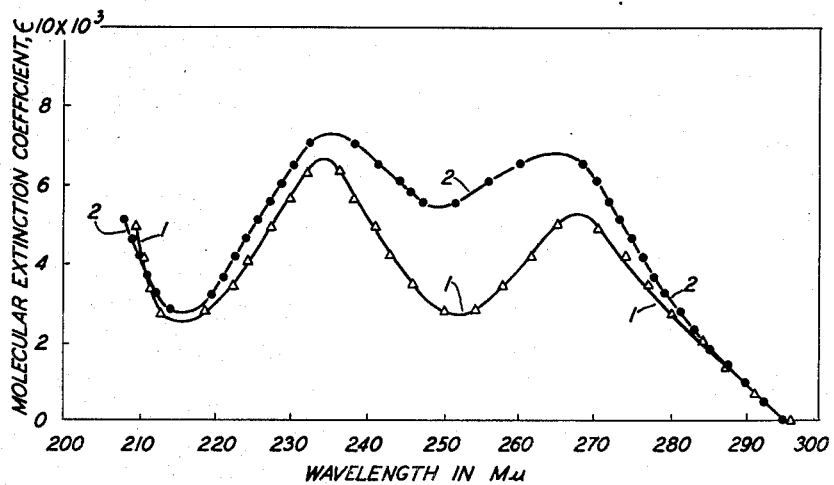
1. 2-METHYL-5-AMINO-METHYL-6-AMINO-PYRIMIDINE
2. 2,5-DIMETHYL-6-AMINO-PYRIMIDINE Patented Apr. 4, 1939

UNITED STATES PATENT OFFICE 2,153,016

PYRIMIDINE COMPOUNDS

Robert R. Williams, Roselle, N. J., assignor to Research Corporation, New York, N. Y., a corporation of New York Application December 23, 1936, Serial No. 117,417

5 Claims. (Cl. 260—251)

This invention relates to the production of pyrimidine compounds akin to the pyrimidine portion of vitamin $B_1$.

Vitamin $B_1$, also known as the antineuritic vitamin, is a component of many natural food stuffs, which is essential for the growth and well being of animals, including man. It is also useful in the treatment of diseases, notably beriberi. Pyrimidine compounds of the type disclosed herein are useful in the synthetic production of vitamin $B_1$ and related compounds having similar physiological properties. The structure of vitamin $B_1$ is discussed in articles by R. R. Williams et al. published in The Journal of American Chemical Society, vol. 57, pp. 229, 517, 536, 1093, 1731, 1849, 1876 and 1887 (1935); vol. 58, pp. 1063 and 1504 (1936).

Vitamin $B_1$ is made up of a pyrimidine derivative and a thiazole derivative in chemical combination. The pyrimidine portion of the antineuritic vitamin comprises the group $$\begin{array}{c} N=C- \\ | \quad | \\ CH_3-C \quad C-CH_2- \\ \| \quad \| \\ N-C- \end{array}$$

and the objects of the present invention are to provide monocyclic pyrimidine compounds comprising this group and to provide methods of making such pyrimidine compounds.

The above described and other objects and features of the invention will be apparent from the following detailed description of specific embodiments thereof, together with the accompanying drawing in which the single figure represents typical absorption spectra in the ultra violet range of two pyrimidine compounds embodying the invention.

One compound embodying the invention is 2-methyl-6-amino-pyrimidine-5-methyl-sulphonic acid, having the structure $$\begin{array}{c} N=C-NH_2 \\ | \quad | \\ CH_3-C \quad C-CH_2-SO_3H \\ \| \quad \| \\ N-C-H \end{array}$$

This is a compound which is sparingly soluble in water and still less soluble in other neutral solvents, but is freely soluble in ammonia or alkali. It undergoes very slight decomposition on heating to a temperature up to 400° C. and does not melt up to 440° C.

This substance may be produced by causing a cleavage of a salt of vitamin $B_1$ through the agency of a soluble sulphite. For example, vitamin $B_1$ chloride hydrochloride may be dissolved in a neutral or faintly acid solution of a soluble sulphite, such as sodium or ammonium sulphite, and allowed to stand at room temperature or at a somewhat higher temperature. The resulting reaction breaks the bond joining the pyrimidine portion and the thiazole portion of vitamin $B_1$ and one of the products obtained is 2-methyl-6-amino-pyrimidine-5-methyl-sulphonic acid.

The production of this substance may be carried out in the following manner:

One gram of vitamin $B_1$ chloride hydrochloride and 2 grams of sodium sulphite are dissolved in 15 cc. of water and a saturated solution of sulphurous acid is added until the pH=5 approximately. The solution then is allowed to stand at room temperature for 48 hours and a white, crystalline product separates which consists of nearly pure 2-methyl-6-amino-pyrimidine-5-methyl-sulphonic acid. This is filtered off.

Further amounts of the substance can be recovered from the filtrate by making it alkaline with a slight excess of sodium hydroxide, extracting with ether to remove 4-methyl-5-β-hydroxyethyl-thiazole which is also formed as a result of the cleavage by sulphite and subsequently acidifying the aqueous solution with sulphurous acid and evaporating it to about 10 cc. volume. Upon cooling further amounts of the pyrimidine sulphonic acid crystallize out together with a little sodium sulphite. The second crop may be purified by dissolving in a minimum quantity of hot water and cooling to crystallize out the pyrimidine sulphonic acid. The total yield is about 570 mgs. or nearly the theoretical.

Another compound embodying the invention is the one designated 2-methyl-6-oxy-pyrimidine-5-methyl-sulphonic acid, which has the formula $$\begin{array}{c} N=C-OH \\ | \quad | \\ CH_3-C \quad C-CH_2SO_3H \\ \| \quad \| \\ N-C-H \end{array}$$

One method of producing 2-methyl-6-oxy-pyrimidine-5-methyl-sulphonic acid, is to heat 302 grams of the above 2-methyl-6-amino-pyrimidine-5-methyl-sulphonic acid in a sealed tube with 6 cc. of concentrated hydrochloric acid sp. g. 1.20 for 3 hours at 150° C. The reaction mixture is evaporated to dryness, the residue is dissolved in 5 cc. of hot water and absolute alcohol is added until precipitation begins. After about 10 hours standing of the water-alcohol solution, crystallization is practically complete and the crystalline product which is 2-methyl-6-oxy-5-methyl-sulphonic acid is separated and washed with 95% alcohol. The yield is about 290 mgs. or 96% of the theory.

Another method of producing the above 2-methyl-6-oxy-pyrimidine-5-methyl-sulphonic acid is as follows:

300 mgs. of 2-methyl-5-ethoxymethyl-6-oxy-pyrimidine prepared according to the method described in the co-pending application of Robert R. Williams and Joseph K. Cline, Serial No. 85,350, filed June 15, 1936, are placed in a bomb tube containing 1 gram of sodium sulphite and 5 cc. of water. The mixture is saturated with sulphur dioxide, the tube is sealed and heated for 18 hours at about 144° C. At the end of that time the tube is cooled and opened whereupon considerable sulphur dioxide is evolved. To the pale yellow solution remaining in the tube concentrated hydrochloric acid is added to liberate the remaining sulphurous acid. Then the solution is saturated with dry hydrogen chloride and the precipitated sodium chloride is removed by suitable means. Further removal of the last traces of sodium chloride is accomplished by first concentrating the solution, then saturating with hydrogen chloride and removing the precipitated sodium chloride as before. Several such treatments are usually necessary to remove the sodium chloride completely.

After removal of the sodium chloride the solution is evaporated down until an oily residue remains. This is dissolved in 3 cc. of water and the solution diluted with 8 cc. of absolute alcohol. A considerable amount of a white crystalline precipitate settles out on standing in the cold. This precipitate consists principally of 2-methyl-6-oxy-pyrimidine-5-methyl-sulphonic acid which can best be purified by dissolving the solid in 3 cc. of concentrated hydrochloric acid and removing a small residue which remains undissolved. As before, the hydrochloric acid is evaporated off, the residue dissolved in 5 cc. of hot water and the solution diluted with alcohol. Crystals separate after standing, which are removed from the mother liquors. The crystals do not melt up to 360° C. The resulting product is identical in every respect with the product obtained from the vitamin, as described above. The two substances absorb ultra violet light identically and when absolute ethyl alcohol is saturated with both substances the absorption is not more intense than when it is saturated with either one alone.

Still another substance embraced within the invention is 2-methyl-5-amino-methyl-6-amino-pyrimidine. This compound possesses the structural formula:

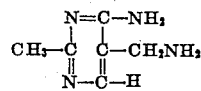

For the production of 2-methyl-5-amino-methyl-6-amino pyrimidine 300 mgs. of vitamin B₁ chloride hydrochloride are dried to constant weight in vacuo at 80° C., approximately 5 cc. of anhydrous ammonia are added thereto, the vessel is sealed and allowed to stand at room temperature for about 48 hours. The ammonia is then evaporated off, the residue is treated with 2 to 3 cc. of 10% sodium hydroxide and the alkaline solution is extracted about ten times with 20 to 25 cc. of chloroform each time. According to one procedure the combined chloroform extracts are extracted with dilute hydrochyoric acid and the aqueous solution is evaporated to dryness, the residue is dissolved in a minimum quantity of absolute alcohol and filtered from any undissolved residue. To the alcoholic solution about 10 volumes of absolute ether are added whereupon after about one to two days standing the hydrochloride of 2-methyl-5-amino-methyl-6-amino pyrimidine separates as needle crystals.

According to another procedure, the above mentioned chloroform extracts are evaporated to dryness leaving a residue of reddish brown gum which crystallizes after 2 to 4 days standing in a dry atmosphere. The crystals which consist of 2-methyl-5-amino-methyl-6-amino pyrimidine in an impure state are partially purified by washing them with a mixture of about 2 cc. of petroleum ether and 1 cc. of absolute alcohol which dissolves most of the adhering gum and leaves most of the crystals undissolved. The crystals are further purified by recrystallization of the free base from hot absolute alcohol or by dissolving in dilute hydrochloric acid to convert the base to the hydrochloride, evaporating to dryness, dissolving the resulting hydrochloride in absolute alcohol and inducing crystallization by adding ether as above described in the first procedure.

The crystalline hydrochloride of 2-methyl-5-amino-methyl-6-amino-pyrimidine obtained by either of the foregoing methods is converted to the free base by dissolving in a slight excess of dilute sodium hydroxide, extracting repeatedly with chloroform, drying the chloroform solution over anhydrous potassium carbonate and evaporating it to dryness. The resulting residue is dissolved in a minimum amount of methyl alcohol and petroleum ether is added till turbidity appears. On standing 2 to 4 days the crystalline free base of 2-methyl-5-amino-methyl-6-amino-pyrimidine separates. It may be further purified by dissolving in a minimum amount of hot absolute alcohol and allowing the solution to stand in a dry atmosphere for 24 hours. The crystals melt at 211 to 215° C. and after heatng at 100° C. in vacuo to expel any carbon dioxide absorbed from the atmosphere analyse for the composition $C_6H_{10}N_4$. Addition of aqueous picric acid to an aqueous solution of the base produces a crystalline picrate melting at 224 to 225° C. and analysing for the composition $C_{18}H_{16}N_{10}O_{14}$.

The invention also contemplates the production of the material known as 2,5-dimethyl-6-amino-pyrimidine and intermediates for the production thereof. The structural formula of this compound is

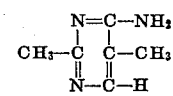

Two methods which may be used to produce this compound will be described.

According to the first method 27 mgs. of 2-methyl-6-amino-pyrimidine-5-methyl-sulphonic acid are suspended in 5 cc. of anhydrous liquid ammonia at about 40° C. and 10 mgs. of metallic sodium are added thereto. After standing for one half hour the excess ammonia is evaporated off in a stream of dry air. When all the ammonia is gone, a few drops of alcohol are added to destroy excess sodium if any is present. The alcohol is then evaporated off and the residue subjected to vacuum sublimation at 120° C. and .1 mm. pressure. The sublimate consists largely of 2,5-dimethyl-6-amino-pyrimidine which may be further purified by sublimation at atmospheric pressure. The sublimate is pure 2,5-dimethyl-6-amino-pyrimidine and melts at 202° C.

The second method of preparing 2,5-dimethyl-6-amino-pyrimidine is as follows:

42 g. of ethyl sodioformyl propionate described in American Chemical Journal, 43, 30 (1910) are dissolved in 200 cc. of water and 26 g. of acetamidine hydrochloride are dissolved with shaking. The solution is allowed to stand for about 48 hours, then evaporated on the steam bath till crystals begin to appear, then made faintly alkaline with ammonia and extracted repeatedly with chloroform. The chloroform extract is dried over anhydrous sodium sulphate and the chloroform evaporated in vacuo. The solid residue consisting of impure 2,5-dimethyl-6-oxy-pyrimidine is purified by sublimation at less than 1 mm. pressure at about 125° C. and the sublimate is recrystallized from hot acetone. The product consisting of long needles melts at 174° C. This product is converted to 2,5-dimethyl-6-chlor-pyrimidine by warming under a reflux condenser with 100 cc. of phosphorus oxychloride for one-half hour. The excess phosphorus oxychloride is removed by evaporating in vacuo and the tarry residue is mixed with crushed ice until dissolved. The solution is kept cold and made alkaline with sodium hydroxide and extracted with chloroform. The chloroform extract is dried over anhydrous sodium carbonate and evaporated to dryness in vacuo. The residue is distilled at 40 mm. pressure. The product boiling at 100° C. is nearly pure 2,5-dimethyl-6-chlor-pyrimidine.

This product is digested with an excess of a saturated solution of ammonia in alcohol at 125° C. for 7 hours in a sealed tube. The reaction mixture is evaporated to dryness and the residue dissolved in a minimum amount of water, cooled in an ice bath and treated with an excess of solid potassium hydroxide which precipitates out the product 2,5-dimethyl-6-amino-pyrimidine. This is dried and purified by subliming in vacuo at less than 1 mm. pressure at about 80° C. The melting point of the resulting white crystals is 201 to 202° C.

The identity of the products of the two foregoing methods of preparing 2,5-dimethyl-6-amino-pyrimidine is proved by the fact that on adding an aqueous solution of picric acid to an aqueous solution of either product a crystalline picrate is obtained melting at 222° C. and a mixture of the two picrates also melts sharply at the same temperature.

All of the above mentioned pyrimidine compounds comprise the group

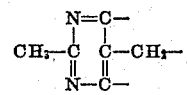

previously unknown to science, and exhibit kindred two banded absorptions in the ultra violet of the type shown in the drawing. The spectrum designated by the numeral 1 in the drawing is that of 2-methyl-5-amino-methyl-6-amino-pyrimidine, and the one designated by the numeral 2 is that of 2,5-dimethyl-6-amino-pyrimidine.

The amino sulphonic acid because of the neutral influence of its basic amino group and its acidic sulphonic group is somewhat peculiar its two absorption bands being almost merged into one. However its sodium salt shows the normal two banded absorption characteristic of this group of compounds. The picrates and hydrochlorides of the 6 amino compounds in this series do not exhibit the characteristic absorption bands. The ultra violet absorption of the picrates is without distinctive bands, that of the hydrochlorides is single banded and not readily distinguishable from the 6-amino-pyrimidines in general.

What is claimed is:

1. The compound

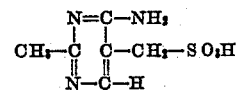

2. The compound

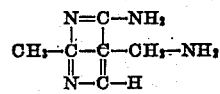

3. The compound

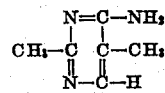

4. The method of making 2-methyl-5-amino-methyl-6-amino-pyrimidine which comprises treating vitamin B₁ chloride hydrochloride with anhydrous ammonia.

5. Pyrimidine compounds having the formula:

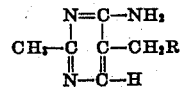

in which R is a member of the group H, NH₂ and SO₃H.

ROBERT R. WILLIAMS.